Patented Oct. 29, 1929

1,733,483

UNITED STATES PATENT OFFICE

JOSEPH R. COOLIDGE, 3D, OF BROOKLINE, MASSACHUSETTS, ASSIGNOR TO MONTAN, INC., OF BOSTON, MASSACHUSETTS, A CORPORATION OF MASSACHUSETTS

PROCESS OF IMPREGNATING WOOD WITH RUBBER

No Drawing.   Application filed January 23, 1926.  Serial No. 83,402.

This invention relates to woods and processes of treating wood.

The desirability of impregnating wood with rubber has long been recognized and many attempts have been made to effect such an impregnation with rubber dissolved in some solvent therefor, such as benzol, naptha, or the like. While these processes which have been proposed do result in an apparent impregnation, careful trials of these methods have convinced me that no real impregnation is produced by them. In duplicating these processes I have found that the solvent does penetrate the wood freely so that a great increase in the weight of the wood is produced, and it is natural to assume, therefore, that a certain amount of the rubber has been carried into the wood with the solvent. Furthermore, the treated wood dries out very slowly, and it subsequently takes up water with much more difficulty than in its untreated condition. All of which conveys the impression that a real impregnation with rubber has been obtained. But a more careful investigation, particularly with a microscope, clearly establishes the fact that all of the rubber is on the outside of the wood and that there is no rubber in the interior structure of the wood.

It is the chief object of the present invention, therefore, to devise a thoroughly practical method of effecting a genuine impregnation of wood with rubber. The invention also involves a novel product.

It should be borne in mind that the microscopic cells, commonly called "tracheids", make up the greater part of the structure of wood. Consequently, in order to produce a real impregnation of the wood with rubber, it is necessary to introduce the rubber into the tracheids. While a certain impregnation might be obtained in diffused porous woods by filling the pores of the wood, only a partial impregnation can be produced in this manner, and an impregnating material which would enter only the pores, and not the tracheids, could not be used satisfactorily in non-porous woods, such, for example, as spruce and southern pine. Furthermore, in order to effect a satisfactory impregnation, the impregnating medium must be of such a nature that it will flow through the bordered pits of the tracheids which are much smaller than the tracheids themselves. It is known that the molecules or globules of rubber when in solution in solvents are much too large to go through the bordered pits, and it is for this reason that those persons most highly skilled in the art of wood preservation and thoroughly familiar with wood structure have considered it impossible to impregnate wood with rubber.

I have found, however, that it is entirely possible to impregnate the pores and tracheids of wood with certain forms of rubber latex. Commercial latexes having substantially the same rubber content seem to vary widely in character; but I have obtained very surprising results by using commercial rubber latex which contains a relatively large proportion of ammonia so that it seems thin and is devoid of the relatively thick or viscous consistency which is characteristic of some other grades of latex. A typical specimen of latex with which I have produced satisfactory results contains approximately 35%, by weight, of rubber, 62% of water, and 3% of ammonia ($NH_3$).

According to the process which I prefer to use, the wood to be treated should be fairly dry, although the water content permissible in the wood will vary considerably with the degree of impregnation which is desired. Where a thorough impregnation is required the wood should be very dry, or else should be subjected to treatment at the beginning of the process to remove surplus water, as, for example, by heating it under a vacuum. This is not ordinarily necessary, however, unless the wood contains an excessive amount of water.

The wood preferably is placed in a cylinder similar to those used in impregnating wood with preservatives, the cylinder is filled with latex so as to submerge the wood, and sufficient pressure is then applied to the liquid to force it into the wood. The pressure may vary considerably, but ordinarily a pressure of from 150 lbs. to 250 lbs. is sufficient. In a typical treatment a pressure of 100 lbs. per square inch may be applied at the start and can be stepped up 25 lbs. at the end of each hour. Usually an ample impregnation is realized in four or five hours. This impregnation may be, and preferably is, carried on at ordinary room temperatures, although I have also obtained satisfactory results by treating at temperatures as high as 180° F. The latex penetrates the wood more freely, however, at lower temperatures and the latex remaining after treatment is practically as good as ever.

At the end of the treatment the pressure is relieved, the wood is removed and is allowed to dry. This drying operation proceeds much slower than usual because the pores and tracheids of the wood are partly blocked with the rubber particles of molecules, and a great part of the water contained in the latex must work out by capillarity through the fibrous walls of the pores and tracheids.

The dried wood will be found to be very thoroughly impregnated with the rubber residue left from the evaporation of the liquid constituent of the latex. The fact that the rubber actually is in the tracheids of the wood can be definitely determined by a microscopic examination of sections of the treated pieces. That there is rubber all through the wood also can be more easily demonstrated by breaking a piece of the wood across the grain sufficiently to separate the fibres of the two sections of wood. It will then be found by pulling the two sections away from each other parallel to the grain that they are still held together by a multitude of threads of rubber which will stretch out as the sections are separated and will draw the two sections together again when they are released.

The reason for the favorable results produced by this process are somewhat obscure and may be open to some differences of opinion, but the following is the best explanation which I am able to give:—When the rubber latex with which I have obtained the best results is collected originally from rubber trees, it is the custom, according to the best information that I am able to obtain, to mix this latex with ammonia while it is still fresh and sweet, and then to evaporate a large part of the surplus water so that when the latex is ready for shipment it contains somewhere from 30% to 35%, or possibly somewhat more, of rubber suspended in commercial ammonia. In such a latex the molecules of rubber are small, are substantially free of each other, and are prevented from agglomerating or coagulating, partly due to the presence of the ammonia and partly, also, it is believed, by the molecules being covered with a protective coating of casein. A latex of this kind can be used very successfully in impregnating wood. If, however, the latex is not carefully prepared, and the molecules are allowed to coagulate or agglomerate, the latex then will not produce nearly as favorable results, and if the latex "sours" it cannot then be used successfully. The rubber molecules, so long as they remain in a substantially free condition, are small enough to pass through the bordered pits of the tracheids, but as soon as they form clusters or groups, as they do unless considerable care is taken to prevent such action, such groups or clusters are too large to enter the bordered pits, and consequently, an impregnation is impossible. It is important therefore to use latex which has been carefully prepared and preserved so that it is fresh and sweet and in which coagulation of the rubber molecules has been prevented. Such latex is readily obtainable.

It is possible, also, to make a water dispersion of rubber by methods well understood in the rubber industry which has the same general characteristics as good commercial latex and may be used in place of it, the necessary protective casein being supplied and the rubber particles usually being broken up by passing the whole preparation through a colloid mill. Such a dispersion is prepared for and is used as an equivalent of latex. I prefer, however, to use the latex.

While I have especially referred to ammonia, as the alkali used to preserve the latex, it will be understood that the invention is not limited to the use of an ammoniacal latex this base being referred to because it is the one commonly used.

An important advantage which follows from the impregnation of the wood with a latex which is strongly alkaline is that any acid in the wood is neutralized. This is desirable where the impregnated wood is to be used for storage battery separators or boxes or in cloth finishing or dying machinery. If desired, the wood may first be impregnated with an alkali and then with latex.

Wood impregnated by the method above described can be vulcanized in a number of ways, as for example, by mixing a vulcanizing agent, such as milk of sulphur or sulphur chloride, with the latex before the impregnating process is performed, and subsequently heating the wood sufficiently to effect vulcanization. Vulcanization may also be effected by suspending the wood in sulphur chloride vapor at a proper temperature, say, for example, 95° F. until vulcanization is effected. Such vulcanization is often desirable to harden the wood. The inclusion of a vulcanizing ingredient in the impregnating medium is also desirable at times where the wood is subsequently to be embedded in or vulcanized to a rubber body. For example, in making composition panels of rubber and wood, the wood may be impregnated in the manner above described, then pressed against a heavy sheet of unvulcanized rubber of suitable composition and the two vulcanized together under heat and pressure. Where a heavy sheet of ruber properly prepared is mechanically pressed against a piece of wood impregnated with rubber and the two vulcanized together by the application of heat a sufficient quantity of the vulcanizing ingredients will escape from the rubber into the wood to effect the desired union between the rubber and wood bodies.

Wood impregnated in the manner above described, whether vulcanized or not, undergoes a very marked change in characteristics. Its ability to absorb moisture is tremendously reduced, its tensile strength is increased, and its elastic limit is raised. I have found it entirely possible to impregnate wood with as high as 40% of its own weight of pure rubber. The fact that it is substantially waterproof greatly reduces the tendency of the wood to shrink and swell with changing conditions of atmospheric moisture, and removes one of the most serious objections to the use of wood in many industries. The fact, also, that wood so impregnated can be vulcanized to rubber is an important advantage in many arts. It is contemplated that wood treated as above described will be used in storage batteries, acid tanks, cloth finishing and dyeing machinery and a great variety of machines and apparatus, especially where the wood is to be subjected to the action of steam, hot water or other hot fluids.

Having thus described my invention, what I desire to claim as new is:

1. That improvement in the process of treating wood which consists in forcing rubber latex into the pores and tracheids of the wood and using sufficient alkali in the latex to neutralize any acid with which the latex comes in contact in the wood.

2. The improvement in the process of treating wood which consists in impregnating the wood with an alkali and subsequently forcing rubber latex into the pores and tracheids of the wood.

JOSEPH R. COOLIDGE, III.